(12) United States Patent
Okada

(10) Patent No.: US 11,014,172 B2
(45) Date of Patent: May 25, 2021

(54) DRILL AND DRILLING DEVICE INCLUDING THE SAME

(71) Applicant: MITSUBISHI HEAVY INDUSTRIES, LTD., Tokyo (JP)

(72) Inventor: Shuichi Okada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/325,503

(22) PCT Filed: Aug. 28, 2017

(86) PCT No.: PCT/JP2017/030816
§ 371 (c)(1),
(2) Date: Feb. 14, 2019

(87) PCT Pub. No.: WO2018/100812
PCT Pub. Date: Jun. 7, 2018

(65) Prior Publication Data
US 2019/0168316 A1 Jun. 6, 2019

(30) Foreign Application Priority Data
Dec. 1, 2016 (JP) .............................. JP2016-234056

(51) Int. Cl.
*B23B 51/10* (2006.01)
*B23B 51/08* (2006.01)
(Continued)

(52) U.S. Cl.
CPC .......... *B23B 51/101* (2013.01); *B23B 45/008* (2013.01); *B23B 51/02* (2013.01);
(Continued)

(58) Field of Classification Search
CPC . B23B 51/101; B23B 51/102; B23B 2220/08; B23B 2251/046; B23B 45/008;
(Continued)

(56) References Cited

U.S. PATENT DOCUMENTS

| 960,635 | A | * | 6/1910 | Geddes | .................. B23B 51/02 |
| | | | | | 408/212 |
| 3,924,693 | A | * | 12/1975 | Whitehouse | ............ B23B 45/04 |
| | | | | | 173/169 |

(Continued)

FOREIGN PATENT DOCUMENTS

| EP | 0427510 A1 | 5/1991 |
| EP | 0642863 A1 | 3/1995 |

(Continued)

OTHER PUBLICATIONS

International Search Report and Written opinion for International Application No. PCT/JP2017/030816 dated Nov. 7, 2017; 24pp.

(Continued)

*Primary Examiner* — Chwen-Wei Su
(74) *Attorney, Agent, or Firm* — Kanesaka Berner and Partners LLP

(57) ABSTRACT

Provided is a drill that can drill with good accuracy without over-processing during deburring. The drill includes: a drill main body that is rotated around a central axis; a main cutting edge provided at a leading end of the drill main body; and a deburring cutting edge that is provided on a base end side of the drill main body, adjacent to the main cutting edge, and performs deburring. The deburring cutting edge is similar in diameter to the main cutting edge and has an angle ($\beta$) smaller than an angle ($\alpha$) formed by the main cutting edge relative to the central axis.

4 Claims, 9 Drawing Sheets

(51) Int. Cl.
*B23B 51/02* (2006.01)
*B23B 45/00* (2006.01)

(52) U.S. Cl.
CPC .......... *B23B 51/102* (2013.01); *B23B 51/08* (2013.01); *B23B 2215/04* (2013.01); *B23B 2220/08* (2013.01); *B23B 2251/046* (2013.01)

(58) Field of Classification Search
CPC ....... B23B 45/02; B23B 45/044; B23B 51/08; B23B 51/02; B23B 2215/04; B23D 77/00; B23D 77/12; B23D 2277/52; B23D 2277/04; B23D 2277/72; B25F 5/001; Y10T 408/34
See application file for complete search history.

(56) References Cited

U.S. PATENT DOCUMENTS

| | | | | |
|---|---|---|---|---|
| 4,572,714 | A * | 2/1986 | Suzuki | B23B 51/02 407/53 |
| 5,011,341 | A | 4/1991 | Degroff | |
| 5,186,584 | A * | 2/1993 | Muller | B23B 51/02 408/224 |
| 5,478,176 | A | 12/1995 | Stedt et al. | |
| 6,200,078 | B1 * | 3/2001 | Kubota | B23B 51/048 407/53 |
| 6,431,801 | B2 * | 8/2002 | Vasudeva | B23B 31/005 408/211 |
| 6,652,203 | B1 * | 11/2003 | Risen, Jr. | B23B 51/02 408/225 |
| 7,204,663 | B2 * | 4/2007 | Dov | B23B 51/08 407/53 |
| 8,403,072 | B2 * | 3/2013 | Eshleman | B25B 21/00 173/1 |
| 8,602,698 | B2 * | 12/2013 | Craig | B23B 51/08 409/132 |
| 8,714,888 | B2 * | 5/2014 | Bean | B25F 5/001 173/216 |
| 2006/0110225 | A1 | 5/2006 | Dov et al. | |
| 2012/0269591 | A1 | 10/2012 | Shimada | |

FOREIGN PATENT DOCUMENTS

| | | |
|---|---|---|
| EP | 2599569 A1 | 6/2013 |
| JP | S50108087 U | 9/1975 |
| JP | 57107718 A | 7/1982 |
| JP | H03170214 A | 7/1991 |
| JP | H06036713 U | 5/1994 |
| JP | H10128610 A | 5/1998 |
| JP | 2000288813 A | 10/2000 |
| JP | 2005161434 A | 6/2005 |
| JP | 2005246577 A | 9/2005 |
| JP | 2008036759 A | 2/2008 |
| JP | 2010247265 A | 11/2010 |
| JP | 2011104766 A | 6/2011 |

OTHER PUBLICATIONS

EESR for EP 17875515.3 dated Jul. 31, 2019.
Office Action for Japanese Application No. 2018-553660 dated Sep. 1, 2020; 4 pp.

* cited by examiner

DRILL AND DRILLING DEVICE INCLUDING THE SAME

RELATED APPLICATIONS

The present application is a National Phase of International Application Number PCT/JP2017/030816 filed Aug. 28, 2017 and claims priority to Japanese Application 2016-234056 filed Dec. 1, 2016.

TECHNICAL FIELD

The present invention relates to a drill that removes burrs formed during drilling, and to a drilling device including this drill.

BACKGROUND ART

For example, when a hole is bored by a drill in a member made of metal etc., burrs are formed at a circumferential edge of the hole on an outlet side. These burrs are manually removed after drilling. In the case of boring a large number of holes, however, manually removing burrs is inefficient because of the time taken for the operation. Therefore, as disclosed by the following Patent Literatures, a cutting edge for deburring is integrally formed in a drill to perform also deburring after drilling.

CITATION LIST

Patent Literature

Japanese Unexamined Patent Application, Publication No. 2000-288813
Japanese Unexamined Patent Application, Publication No. Hei 10-128610
Japanese Unexamined Patent Application, Publication No. 2005-246577
Japanese Unexamined Patent Application, Publication No. 2005-161434

SUMMARY OF INVENTION

Technical Problem

In the case of forming holes for fasteners in an airframe of an airplane, more than 1000 holes need to be formed, and moreover, the shapes of these holes are subject to stringent accuracy requirements. Thus, excessive processing during deburring may result in a hole shape that fails to meet the requirements.

The present invention has been contrived in view of these circumstances, and an object of the invention is to provide a drill that can drill with good accuracy without over-processing during deburring, and a drilling device including this drill.

Solution to Problem

To solve the above problem, a drill and a drilling device including the same of the present invention have adopted the following solutions.

A drill according to an aspect of the present invention includes: a drill main body that is rotated around a central axis; a main cutting edge provided at a leading end of the drill main body; and a deburring portion that is provided on a base end side of the drill main body, adjacent to the main cutting edge, and performs deburring, wherein the deburring portion is provided with a deburring cutting edge that is similar in diameter to the main cutting edge and has an angle smaller than an angle formed by the main cutting edge relative to the central axis.

Drilling is performed by the main cutting edge provided at the leading end of the drill main body. After drilling is performed, burrs formed during drilling are removed by the deburring cutting edge. Deburring is performed by the deburring cutting edge when the drill is withdrawn in the opposite direction from a direction in which the drill has been advanced along the direction of the central axis during drilling.

Since the deburring cutting edge is provided so as to have an angle smaller than the angle formed by the main cutting edge relative to the central axis, it is unlikely that a hole formed by the main cutting edge is over-processed and damaged during deburring. Moreover, since the deburring cutting edge is similar in diameter to the main cutting edge, it is not necessary to move the drill with a high degree of eccentricity during the deburring operation.

A drill according to an aspect of the present invention includes: a drill main body that is rotated around a central axis; a main cutting edge provided at a leading end of the drill main body; and a deburring portion that is provided on a base end side of the drill main body, adjacent to the main cutting edge, and performs deburring, wherein the deburring portion has a tapered surface of which a diameter decreases in a direction away from the main cutting edge.

Burrs are removed as the deburring portion having the tapered surface is pressed and scraped against the burrs. Having the tapered surface, this deburring portion is less likely to damage a hole formed by the main cutting edge than the one having the cutting edge.

The surface formed as the tapered surface may be a smooth surface, but may also be a file-like rough surface to facilitate deburring.

The tapered surface may be integrally formed in the drill may body, or may be formed by attaching a member having a tapered surface to the drill main body.

A drilling device according to an aspect of the present invention includes: any one of the above-described drills; a rotating shaft that is fixed to the drill main body and applies a torque to the drill main body; and a rotation speed varying unit that varies a rotation speed of the rotating shaft, wherein the rotation speed varying unit rotates the rotating shaft at a first rotation speed when drilling is performed by the main cutting edge, and rotates the rotating shaft at a second rotation speed that is a rotation speed lower than the first rotation speed when deburring is performed by the deburring portion.

Since deburring can be performed at a rotation speed lower than a rotation speed at which drilling is performed by the main cutting edge, a hole formed by the main cutting edge can be prevented from damage during deburring as far as possible.

Advantageous Effects of Invention

The present invention makes it unlikely that a hole formed by a main cutting edge is over-processed and damaged during deburring.

DESCRIPTION OF EMBODIMENTS

In the following, embodiments according to the present invention will be described with reference to the drawings.

First Embodiment

A first embodiment of the present invention will be described below using FIG. 1 to FIG. 4.

Figure 1:
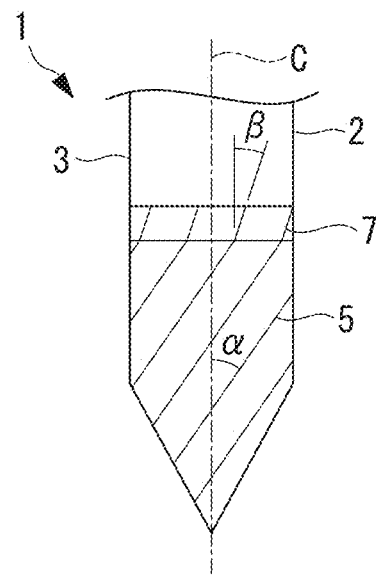
FIG. 1 is a side view showing a drill according to a first embodiment of the present invention.

FIG. 1 shows a drill 1 according to this embodiment. The drill 1 is made of tool steel, and roughly has the shape of a solid round bar with a sharp point. The drill 1 is rotated around a central axis C and includes a drill main body 3 having a shank 2.

The shank 2 (a base end part; the upper end in FIG. 1) of the drill main body 3 is detachably fixed to a rotating shaft of a driver drill (drilling device) that is not shown.

A plurality of ridges of main cutting edges 5 having a spiral shape is provided at a leading end (the lower end in FIG. 1) of the drill main body 3. Drilling is performed by the main cutting edges 5. The main cutting edges 5 are provided so as to have an inclination angle α of 25° relative to the central axis C.

On an upper side of the main cutting edges 5, a plurality of ridges of deburring cutting edges (a deburring portion) 7 is provided adjacent to the main cutting edges 5. Burrs formed during drilling by the main cutting edges 5 are removed by the deburring cutting edges 7. The outside diameter of the deburring cutting edges 7 is similar to the outside diameter of the main cutting edges 5. The deburring cutting edges 7 are provided so as to have an inclination angle β of not smaller than 15° nor larger than 20° relative to the central axis C. Thus, the inclination angle β of the deburring cutting edges 7 is smaller than the inclination angle α of the main cutting edges 5 by not smaller than 5° nor larger than 10°.

The drill 1 thus configured is used as follows.

Figure 2:
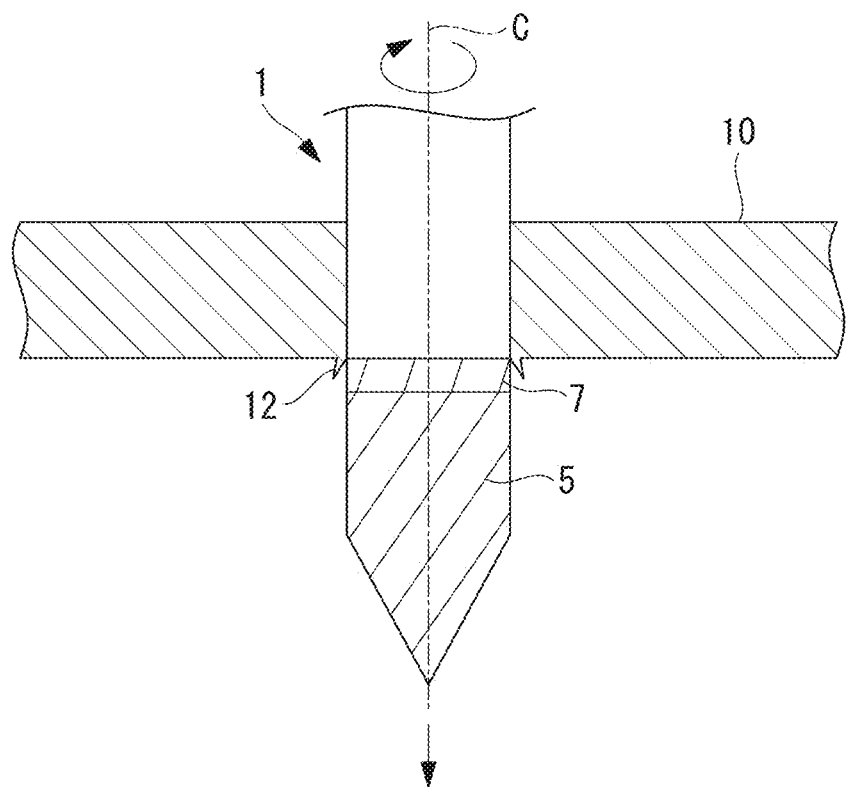
FIG. 2 is a side view showing a state where drilling is performed by using the drill of FIG. 1.

As shown in FIG. 2, the drill 1 is attached to the driver drill and then advanced downward toward a workpiece 10 while being rotated around the central axis C. Thus, a hole is formed in the workpiece 10 by the main cutting edges 5. For example, a plate body made of metal, such as aluminum alloy or titanium alloy, is used as the workpiece 10.

Figure 3:
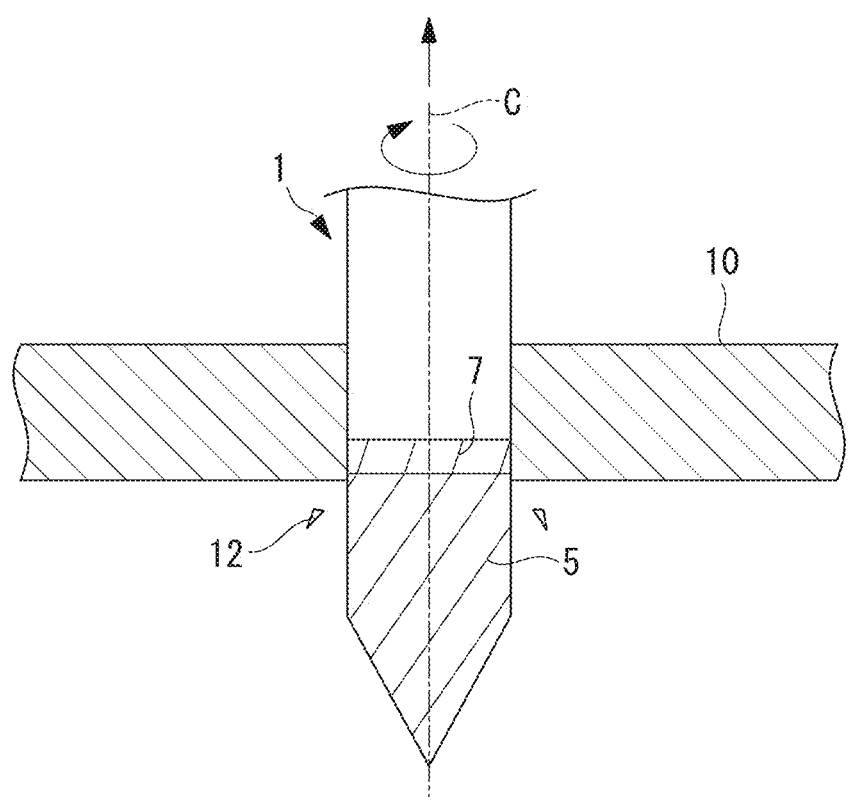
FIG. 3 is a side view showing a state where deburring is performed by using the drill of FIG. 1.

When a hole is formed by the main cutting edges 5, burrs 12 are formed at a circumferential edge of the hole on an outlet side (the lower side in FIG. 2). The burrs 12 are removed when the drill 1 is withdrawn upward while being rotated. Specifically, while the drill 1 is pulled out, the deburring cutting edges 7 come into contact with the burrs 12 and thereby cut off the burrs 12, as shown in FIG. 3. Here, the entire drill 1 may be turned eccentrically around the center of the formed hole so as to come into contact with the burrs 12. However, since the deburring cutting edges 7 are similar in diameter to the main cutting edges 5, the degree of eccentricity need not be high.

As has been described above, this embodiment offers the following advantages.

Since the deburring cutting edges 7 are provided so as to have the inclination angle β smaller than the inclination angle α formed by the main cutting edges 5 relative to the central axis C, it is unlikely that a hole formed by the main cutting edges 5 is over-processed and damaged during deburring. Moreover, since the deburring cutting edges 7 are similar in diameter to the main cutting edges 5, it is not necessary to move the drill 1 with a high degree of eccentricity during the deburring operation. Thus, the efficiency of the drilling operation including the deburring operation improves.

Figure 4:
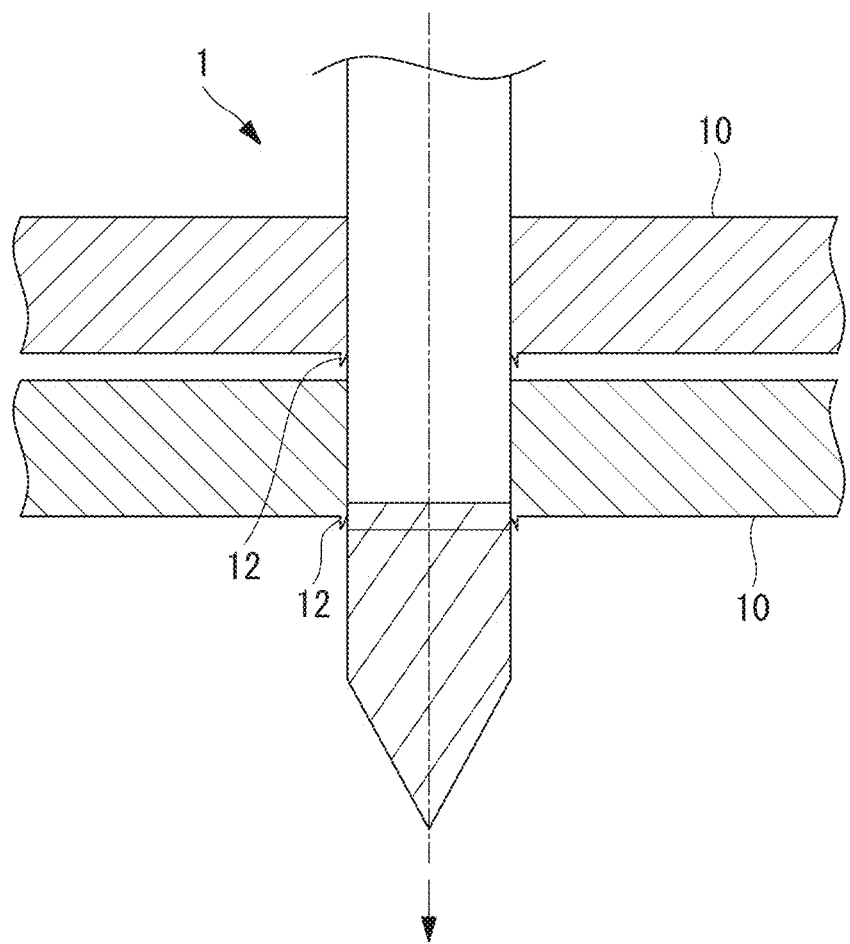
FIG. 4 is a side view showing a state where two workpieces placed one on top of the other are processed.

The drill 1 of this embodiment can also be used to drill a plurality of workpieces 10 placed on top of one another in a thickness direction as shown in FIG. 4, and can also remove the burrs 12 formed on each workpiece 10.

Second Embodiment

Figure 5:
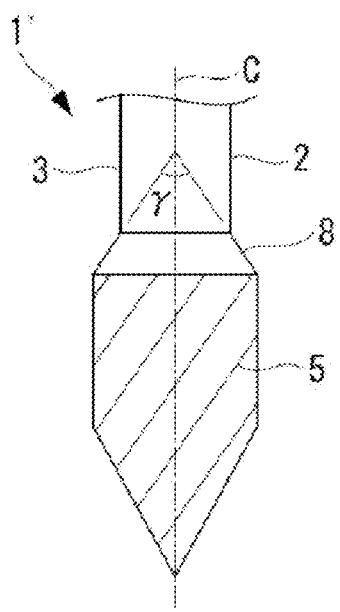
FIG. 5 is a side view showing a drill according to a second embodiment of the present invention.

Next, a second embodiment of the present invention will be described using FIG. 5 and FIG. 6.

This embodiment is different from the first embodiment in the shape of the deburring portion that performs deburring. Since the other parts are the same, these will be denoted by the same reference signs and the description thereof will be omitted.

On the upper side of the main cutting edges 5 of a drill 1', a deburring portion 8 having a tapered surface of which the diameter decreases in a direction away from the main cutting edges 5 is provided. The surface formed as the tapered surface is a smooth surface. Alternatively, this surface may be a file-like rough surface to facilitate deburring. An inclination angle γ of the tapered surface is not smaller than 88° nor larger than 102°.

The deburring portion 8 is integrally formed in the drill main body 3. Alternatively, the deburring portion 8 may be formed by attaching a member having a tapered surface to the drill main body 3. In this case, the deburring portion 8 made of a material different from tool steel, for example, hard rubber, can be used.

Figure 6:
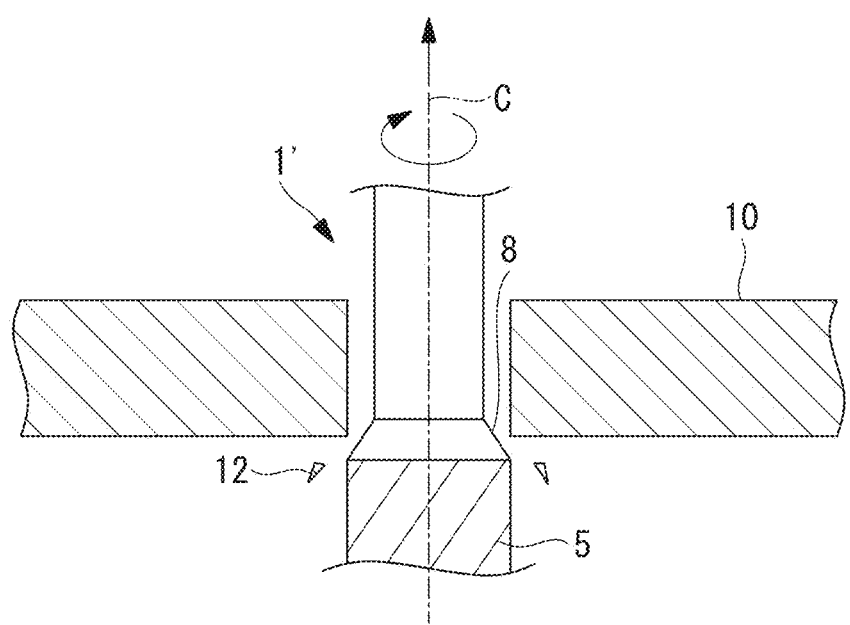
FIG. 6 is a side view showing a state where deburring is performed by using the drill of FIG. 2.

According to the drill 1' of this embodiment, when a hole is formed and then the drill 1' is pulled out while being rotated, the burrs are removed as the deburring portion 8 having the tapered surface is pressed against the burrs 12, as shown in FIG. 6. Having the tapered surface, the deburring portion 8 is less likely to damage the hole than the one having the cutting edges.

The drill 1' of this embodiment can also remove the burrs 12 that are formed on each workpiece 10 during drilling of the workpieces 10 placed on top of one another, as shown in FIG. 4.

Third Embodiment

Next, a third embodiment of the present invention will be described. This embodiment is a driver drill (drilling device) that can be used with the drill 1 or 1' of the above embodiment attached thereto.

Figure 7:
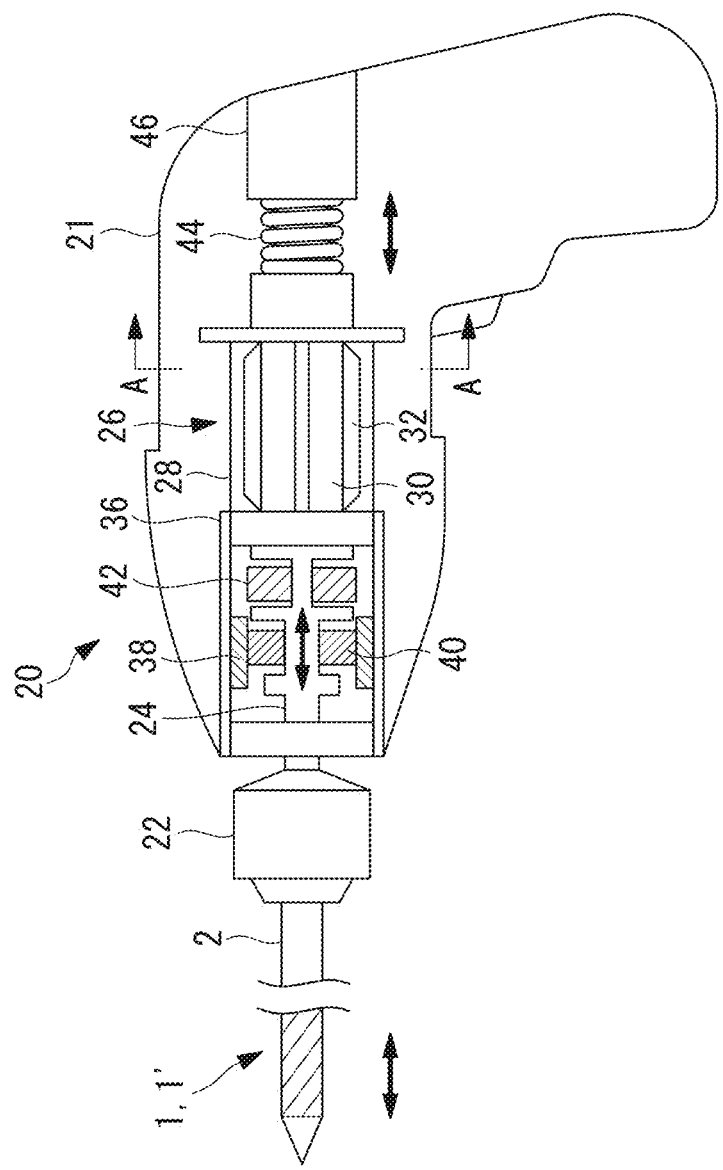
FIG. 7 is a longitudinal sectional view showing a driver drill according to a third embodiment of the present invention.

As shown in FIG. 7, a driver drill 20 drives the drill 1 or 1' to rotate by air (compressed air). The driver drill 20 includes a chuck 22 that grasps the shank 2 of the drill 1 or 1', and a rotating shaft 24 that is fixed to the chuck 22 and rotates. The rotating shaft 24 is connected to an air driving unit 26.

Figure 8:
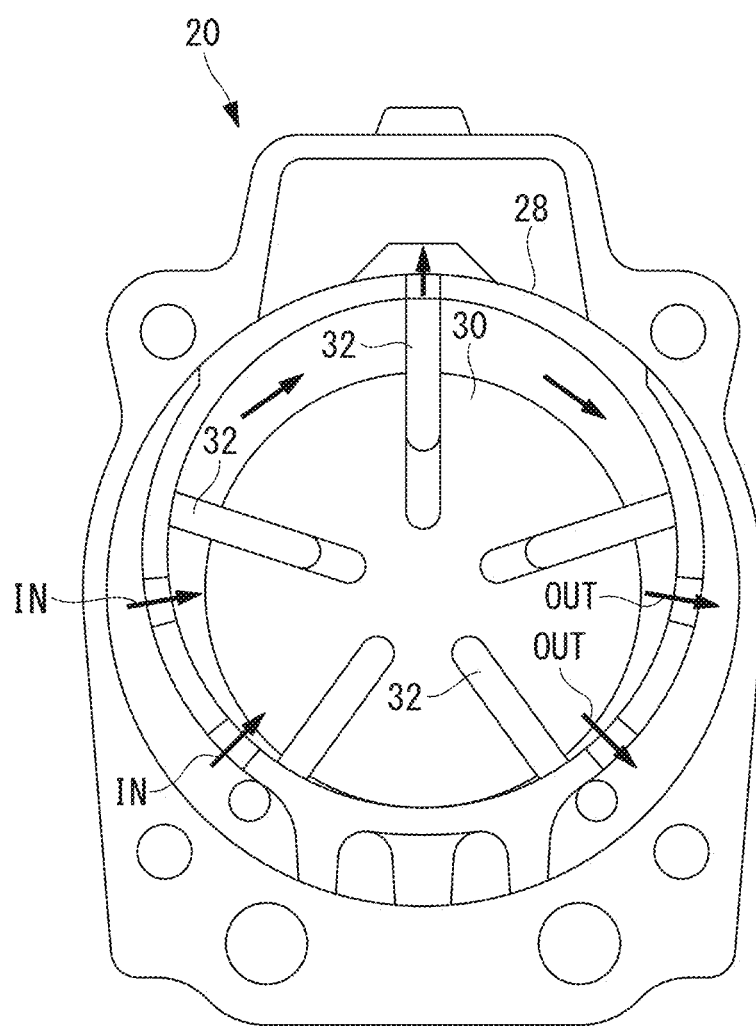
FIG. 8 is a cross-sectional view showing section A-A of FIG. 7.

As shown in FIG. 8, the air driving unit 26 includes a rotor 30 housed inside a cylinder 28, and a plurality of vanes 32. The vanes 32 are inserted, so as to be reciprocatable, in corresponding grooves that are formed in the rotor 30 and extend in radial directions. The vanes 32 are moved toward a radially outer side by a centrifugal force that is generated as the rotor 30 rotates.

Air supplied from outside the driver drill 20 is supplied into the cylinder 28 from the directions of arrows IN. The air having been supplied into the cylinder 28 flows between the cylinder 28 and the rotor 30, thereby driving the vanes 32 around the center of the rotor 30. After driving the vanes 32, the air is discharged to the outside of the cylinder 28 in the directions of arrows OUT.

The rotating shaft 24 is disposed so as to extend through a gear case 36. The gear case 36 houses an internal gear 38 fixed to an inner circumferential surface of the gear case 36, a plurality of high-speed planetary gears 40, and a plurality of low-speed planetary gears 42.

Each high-speed planetary gear 40 meshes on an inner circumferential side with the rotating shaft 24 serving as a sun gear, and meshes on an outer circumferential side with the internal gear 38 in a state where the rotating shaft 24 is located on the right side in FIG. 7 (i.e., the state shown in FIG. 7). Each low-speed planetary gear 42 meshes on an inner circumferential side with the rotating shaft 24 serving as a sun gear, and meshes on an outer circumferential side with the internal gear 38 in a state where the rotating shaft 24 is located on the left side in FIG. 7.

The air driving unit 26 is connected to a mount 46 through a coil spring 44. The mount 46 is fixed to a casing 21 of the driver drill 20. Thus, the air driving unit 26 is mounted so as to be rotatable relative to the coil spring 44 and the mount 46, and can reciprocate in the direction of a rotational axis (the left-right direction in FIG. 7) as the coil spring 44 expands and contracts. Thus, as the coil spring 44 expands and contracts, not only the air driving unit 26 but also the rotating shaft 24 and the drill 1 or 1' move forward and backward in the direction of the rotational axis.

During drilling, therefore, a reaction force from the workpiece 10 is transmitted through the drill 1 or 1' toward the right side, so that the coil spring 44 contracts and reaches the state shown in FIG. 7, and the high-speed planetary gear 40 and the internal gear 38 mesh with each other. As a result, the drill 1 or 1' rotates at a high speed (first rotation speed).

On the other hand, while the drill 1 or 1' is pulled out upon completion of drilling, a reaction force from the workpiece 10 is not transmitted through the drill 1 or 1', so that the coil spring 44 expands and the low-speed planetary gear 42 and the internal gear 38 mesh with each other. As a result, the drill 1 or 1' rotates at a low speed (second rotation speed).

As has been described above, this embodiment offers the following advantages.

The mechanism that switches between the high-speed planetary gear 40 and the low-speed planetary gear 42 constitutes a rotation speed varying unit, which switches the rotation speed of the drill 1 or 1' between during drilling and during deburring. Thus, deburring can be performed at a rotation speed lower than a rotation speed at which drilling is performed by the main cutting edges 5, so that a hole formed by the main cutting edges 5 can be prevented from damage during deburring as far as possible.

The driver drill of this embodiment can also be modified as follows.

Figure 9:
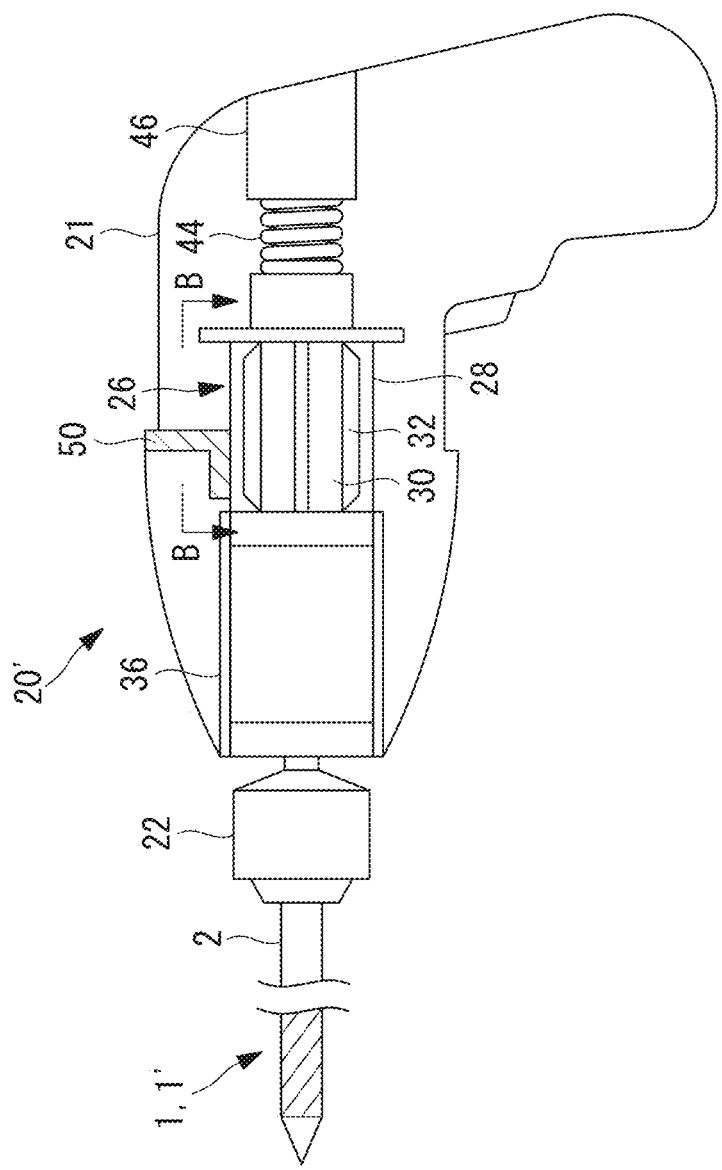
FIG. 9 is a longitudinal sectional view showing a modified example of the driver drill of FIG. 7.
Figure 10A:
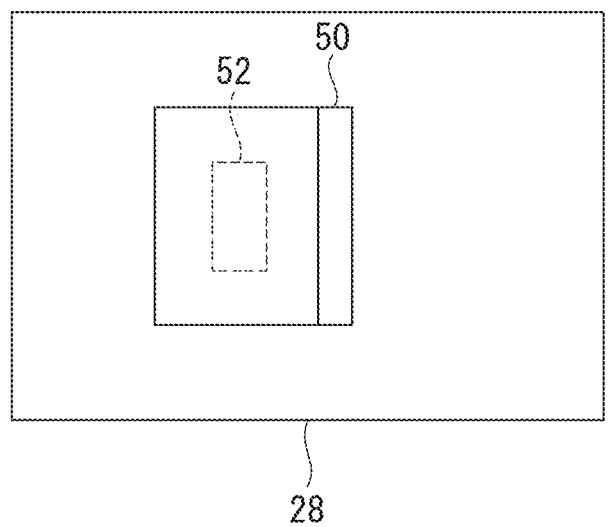
FIG. 10A is a plan view taken along line B-B of FIG. 9, showing a state where an additional exhaust opening is closed.
Figure 10B:
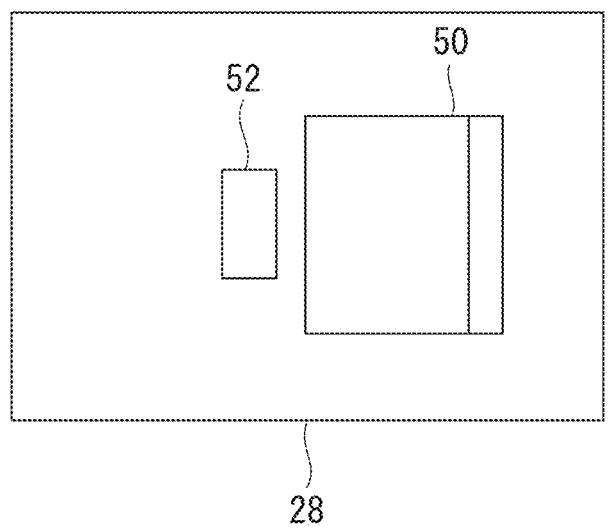
FIG. 10B is a plan view taken along line B-B of FIG. 9, showing a state where the additional exhaust opening is opened.

The rotation speed of the drill 1 or 1' is varied, not by switching between the planetary gears as in the above embodiment, but by varying the flow volume of air exhausted from the air driving unit 26. Specifically, as shown in FIG. 9, a lid 50 having an L-shaped longitudinal section is fixed to the casing 21 of a driver drill 20', at a position close to the cylinder 28 of the air driving unit 26. As shown in FIG. 10A and FIG. 10B, an additional exhaust opening 52 is formed in an upper part of the cylinder 28 facing the lid 50. Since the cylinder 28 moves forward and backward in a horizontal direction (the direction of the rotational axis) as the coil spring 44 expands and contracts, the additional exhaust opening 52 moves relative to the lid 50. Thus, the additional exhaust opening 52 is opened and closed by the lid 50 as the coil spring 44 expands and contracts.

During drilling, a reaction force from the workpiece 10 is transmitted through the drill 1 or 1' toward the right side, so that the coil spring 44 contracts and reaches the state shown in FIG. 9, and the additional exhaust opening 52 is covered by the lid 50 (see FIG. 10A). As a result, a flow volume of exhaust air equivalent to that at a rated rotation speed is secured, so that the drill 1 or 1' rotates at a high speed (first rotation speed).

On the other hand, while the drill 1 or 1' is pulled out upon completion of drilling, a reaction force from the workpiece 10 is not transmitted through the drill 1 or 1', so that the coil spring 44 expands and the additional exhaust opening 52 is exposed without being covered by the lid 50 (see FIG. 10B). As a result, a flow volume of exhaust air inside the cylinder 28 equivalent to that at the rated rotation speed is no longer secured, so that the vanes 32 cannot sufficiently protrude outward from the grooves of the rotor 30, and the drill 1 or 1' rotates at a low speed (second rotation speed).

As has been described above, the mechanism that opens and closes the additional exhaust opening 52 by the lid 50 constitutes the rotation speed varying unit. Thus, deburring can be performed at a rotation speed lower than a rotation speed at which drilling is performed by the main cutting edges 5, so that a hole formed by the main cutting edges 5 can be prevented from damage during deburring as far as possible.

Figure 11:
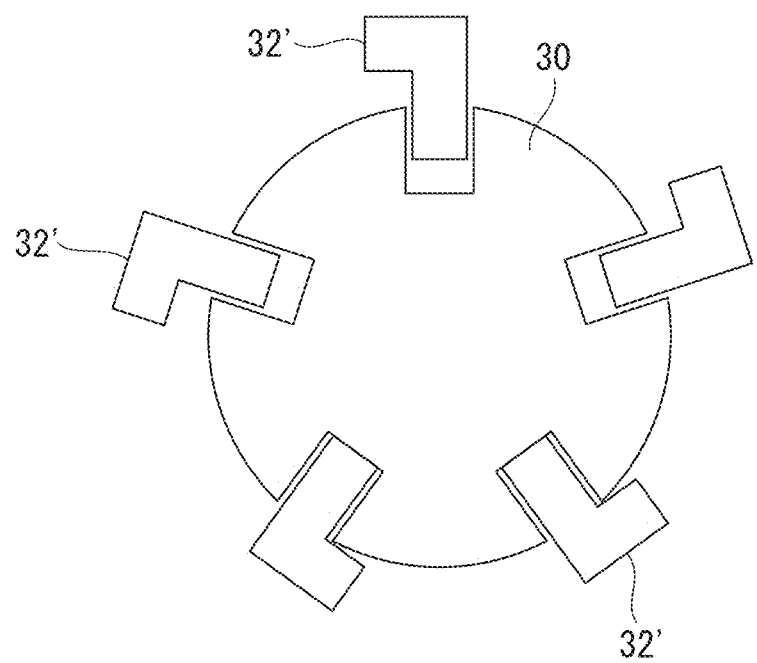
FIG. 11 is a cross-sectional view showing a modified example of vanes mounted on a rotor.

As shown in FIG. 11, leading ends on an outer circumferential side of vanes 32' housed in the grooves formed in the rotor 30 may be bent toward a side from which air is received. Thus, the vanes 32' can receive a large amount of air and thereby increase the rotation efficiency of the rotor 30.

The invention claimed is:

1. A drill comprising:
   a drill main body that is rotated around a central axis;
   a main cutting edge provided at a leading end of the drill main body; and
   a deburring portion that is provided on a base end side of the drill main body, adjacent to the main cutting edge, and performs deburring, wherein
   the deburring portion is provided with a deburring cutting edge that is similar in diameter to the main cutting edge and has an angle smaller by 5° or more and 10° or less than an angle formed by the main cutting edge relative to the central axis, the deburring cutting edge being twisted in a same direction as the main cutting edge.

2. A drilling device comprising:

the drill according to claim 1;

a rotating shaft that is fixed to the drill main body and applies a torque to the drill main body; and a rotation speed varying unit that varies a rotation speed of the rotating shaft, wherein the rotation speed varying unit rotates the rotating shaft at a first rotation speed when drilling is performed by the main cutting edge, and rotates the rotating shaft at a second rotation speed that is a rotation speed lower than the first rotation speed when deburring is performed by the deburring portion.

3. A drill comprising:

a drill main body that is rotated around a central axis;

a main cutting edge provided at a leading end of the drill main body; and a deburring portion that is provided on a base end side of the drill main body, adjacent to the main cutting edge, and performs deburring, wherein the deburring portion is a tapered surface of which a diameter decreases in a direction away from the main cutting edge, the tapered surface being formed entirely around the central axis.

4. A drilling device comprising:

the drill according to claim 3;

a rotating shaft that is fixed to the drill main body and applies a torque to the drill main body; and a rotation speed varying unit that varies a rotation speed of the rotating shaft, wherein the rotation speed varying unit rotates the rotating shaft at a first rotation speed when drilling is performed by the main cutting edge, and rotates the rotating shaft at a second rotation speed that is a rotation speed lower than the first rotation speed when deburring is performed by the deburring portion.

* * * * *